3,839,554
ACARICIDAL COMPOSITIONS FOR
TREATING PLANTS
Jack P. Corkins, Porterville, Calif., assignor to Uniroyal,
Inc., New York, N.Y.
Filed Feb. 18, 1972, Ser. No. 227,615
Int. Cl. A01n 9/14
U.S. Cl. 424—78
2 Claims

ABSTRACT OF THE DISCLOSURE

Improved acaricidal compositions comprising admixtures of (A) a polyoxyethylene-polyoxypropylene-polyoxyethylene ether copolymers represented by the formula:

$$HO[CH_2CH_2O]_x[CH(CH_3)CH_2O]_y[CH_2CH_2O]_xH$$

wherein $x=45$ to 75 and $y=20$ to 60, and (B) propargyl 2-(p-tert.-butylphenoxy) cyclohexyl sulfite. The compositions are characterized by reduced tendencies to induce phytotoxicity upon plants which are treated with the same to provide protection against mites.

BACKGROUND OF THE INVENTION

The invention relates to compositions which are useful as insecticides, especially for the control of mites on plants. There is considerable prior art showing the use of spray adjuvants with insecticides and/or acaricides as deposit builders to control mites. Exemplary of these materials are proteinacious formulations such as casein, latex formulations, and polyethylene oxide formulations. Such formulations, even along with pure surfactant types of so-called spreader-stickers, have not been especially successful commercially in checking mites on plants, and frequently exhibited phytotoxic effects upon the plants treated.

Accordingly, a chief obstacle heretofore was the lack of acaricidal compositions which would effectively control mites and do this without phytotoxic effect on the treated plant.

It has been found that a block polymer of polyoxyethylene-polyoxypropylene - polyoxyethylene ether copolymers in admixture with propargyl 2-(p-tert.-butylphenoxy) cyclohexyl sulfite prevents harmful phytotoxicity and unexpectedly enhances the miticidal activity of the sulfite active ingredient.

DETAILED DESCRIPTION OF THE INVENTION

The invention consists of preparing an admixture composed of a polyoxyethylene-polyoxypropylene-polyoxyethylene ether copolymers represented by the formula:

$$HO[CH_2CH_2O]_x[CH(CH_3)CH_2O]_y[CH_2CH_2O]_xH$$

wherein $x=45$ to 75 and $y=20$ to 60, hereinafter referred to as block copolymer, and propargyl 2-(p-tert.-butylphenoxy) cyclohexyl sulfite, hereinafter referred to as the sulfite compound. When applied to plants, the admixture induces less phytotoxicity and more effective acaricidal or miticidal benefits than the sulfite compound used alone, or with surfactants.

The block copolymer is characterized as having from about 90 to 150 polyoxyethylene units and from about 20 to 60 polyoxypropylene units. Typical examples of such polymers and methods of making the same are found in U.S. Pat. 2,674,619, the contents of which are incorporated herein by reference.

The preferred block copolymer is characterized by the formula:

$$HO[CH_2CH_2O]_{60}[CH(CH_3)CH_2O]_{40}[CH_2CH_2O]_{60}H$$

The operable range of block copolymer to sulfite compound in the admixture is from about 1:2 to 2:1 (parts by weight); however, the preferred ratio employing the preferred block copolymer is from about 1:1 to 2:1.

Generally, the sulfite compound is used in amounts from about 0.2 to 9.0 pounds of active sulfite compound per 100 gallons of solution. However, the particular concentration is not critical, but mainly a matter of convenience. The important factor is that from about 0.5 to 10 pounds of active sulfite compound be deposited on each acre of planted area. Usually, the amounts employed will depend upon such factors as the time of year, the age of the plant, the species and varieties of plants, and the climatic conditions.

One method of treating plants (the term plants as embraced herein includes plant parts such as leaves and stems as well as seeds, fruit, vegetables and the like) with the mixtures is through a comparatively inert medium such as a dust of the acaricidal mixture, admixed with powdered solid carriers, for example, such as mica, talc, diatomaceous earth, pyrophyllite and clays. The acaricidal mixture may also be applied in admixture with various amounts of anionic, cationic, ampholytic or non-ionic surfactive agents.

The copolymer-sulfite acaricidal mixture may further still be admixed with powdered solid carriers, together with a surfactant to form a wettable powder, which may be applied directly to plants, or mixed with water to produce a suspension for application to plants in that form. A yet further method for treating plants with the acaricidal mixture is by way of an emulsion concentrate in a solvent system. The emulsion is obtained by mixing the copolymer-sulfite mixture directly with a suitable solvent system such as xylene, naphtha, or alcohols, and this solvated mixture is then combined with water to form an emulsion. The preferred method for treating plants with the acaricidal mixture is by way of an aqueous emulsion, which is obtained by mixing the copolymer-sulfite mixture with water.

When the acaricidal mixture is to be used in a spray adjuvant form, the block copolymer may be admixed with the sulfite compound before, during or after preparation of the spray.

Exemplary of the copolymer spray adjuvant solution which may be used with the sulfite compound in the form of wettable powder, colloidal suspension, emulsion concentrate or an emulsified flowable formulation is the following:

| Spray adjuvant: | Percent |
|---|---|
| Polyoxyethylene (60) polyoxypropylene (40) polyoxyethylene (60) ether | 70.0 |
| Dioctyl ester of sodium sulfosuccinic acid | 6.4 |
| Propylene glycol | 5.0 |
| Isopropanol | 5.0 |
| Water | 13.6 |
| Total | 100.0 |

Diluents such as glycerol or sorbitol can be substituted for all or part of the propylene glycol, isopropanol and water.

A typical activated dust formulation of the block copolymer and sulfite compound has the formulation following:

| Sulfite Compound Dust (4% Active): | Percent |
|---|---|
| Sulfite compound (80%) active | 5.0 |
| Polyoxyethylene (60) polyoxypropylene (40) polyoxyethylene (60) ether | 2.0 |
| Diatomaceous earth | 5.0 |
| Talc | 88.0 |
| Total | 100.0 |

The sulfite compound and the block copolymer are premixed at approximately 70° C. and then spray impregnated onto the dust diluents.

A typical wettable sulfite powder composition to which the block copolymer has been added contains the following components:

Sulfite compound Wettable Powder (15% Active):

| | Percent |
|---|---|
| Sulfite compound (80% Active) | 18.75 |
| Polyoxyethylene (60) polyoxypropylene (40) polyoxyethylene (60) ether | 10.00 |
| Dispersing agent (dry) | 0.05 |
| Diatomaceous earth | 20.00 |
| Talc | 51.20 |
| Total | 100.00 |

Again the sulfite compound and the block copolymer are pre-mixed at approximately 70° C. and then spray impregnated onto the dry materials.

An emulsion concentrate of the active sulfite compound has the following composition:

Sulfite Compound Emulsion Concentrate 45% Active):

| | Percent |
|---|---|
| Sulfite compound (80% Active) | 56.25 |
| Polyoxyethylene (60) polyoxypropylene (40) polyoxyethylene (60) ether | 27.75 |
| Isopropanol | 16.00 |
| Total | 100.00 |

A typical flowable sulfite compound containing the block copolymer has the following composition:

Sulfite compound Flowable (30% Active):

| | Percent |
|---|---|
| Sulfite compound (80% Active) | 37.5 |
| Polyoxyethylene (60) Polyoxypropylene (40) polyoxyethylene (60) ether | 15.0 |
| Polyoxyethylene (40) castor oil ester | 5.0 |
| Water | 42.5 |
| Total | 100.0 |

Specific applications of the improved acaricidal mixture are demonstrated in the examples following:

EXAMPLE 1

A solution of the acaricidal mixture is prepared to provide about 1,600 p.p.m. of active sulfite compound. This mixture is sprayed on cowpea plants to the point of run-off with several formulations. Five individual plant replicates (at the trifoliate expansion stage) per treatment is used. The phytotoxic effect is evaluated seven days after treatment by arranging the plants from each replicate in a row so that the plant with the least phytotoxicity is on the left end of the row. This is followed by the plant with the next least phytotoxicity, and continued so that the plant with the most phytotoxicity is placed on the right end of the row. Rank numbers were then assigned to each treatment with no phytotoxicity having rank number 1, the least phytotoxicity having rank number 2 and so on, with the treatment having the most phytotoxicity having the highest rank number (in the case number 5).

The treatments in this experiment were:

A. Wettable powder formulation of the sulfite compound:

Sulfite Material:

| | Percent |
|---|---|
| Sulfite compound (90% Active) | 33.33 |
| Sodium N-methyl-N-palmitoyl laurate | 4.00 |
| Alkylaryl polyether alcohol | 2.00 |
| Sodium salt of naphthalene sulfonic acid | 0.20 |
| Alkylnaphthalene sodium sulfonate | 0.05 |
| Sodium silicate | 16.00 |
| Alpine Talc | 44.42 |
| Total | 100.00 |

B. Emulsion concentrate of the sulfite compound which contains a solvent system:

Sulfite Material:

| | Percent |
|---|---|
| Sulfite compound (85% Active) | 80.1 |
| Blend of oil soluble sulfonates+polyethylene ethers | 5.0 |
| Naphtha | 14.9 |
| Total | 100.0 |

C. Aqueous emulsion of 2 parts of sulfite compound (81% active) with 1 part of the block copolymer;

D. Aqueous emulsion of 1 part of sulfite compound with 1 part of the block copolymer;

E. Untreated check.

The results seven days after treatment are shown in Table 1.

TABLE 1

| | Phytotoxicity rank | | | | | |
|---|---|---|---|---|---|---|
| Replicate | 1 | 2 | 3 | 4 | 5 | Mean |
| Treatment: | | | | | | |
| A | 4 | 4 | 4 | 3 | 3 | 3.6 |
| B | 5 | 5 | 5 | 5 | 5 | 5.0 |
| C | 3 | 2 | 2 | 4 | 4 | 3.0 |
| D | 2 | 3 | 3 | 2 | 2 | 2.4 |
| E | 1 | 1 | 1 | 1 | 1 | 1.0 |

The mean rank shows that the untreated check (E) experienced no phytotoxic effect; that the emulsified formulation of the sulfite compound (D) with one part of the block copolymer had the least phytotoxic effect; that the emulsified composition of the sulfite compound having 1 part of a block copolymer to 2 parts of the sulfite compound (C) had the next least phytotoxic effect; that the wettable powder formulation (A) had the next least phytotoxic effect. These results demonstrate the reduction of the sulfite compounds-induced phytotoxicity when the block copolymer is used as compared to the formulations where no block copolymer is incorporated.

EXAMPLE 2

The experiment is conducted on cowpeas in the same manner and with the same sulfite compound rate as that shown in Example 1.

A. Wettable powder formulation of the sulfite compound.

B. Same as A above plus 1.74 pints of the mentioned spray adjuvant per 100 gallons water, providing a 1:1 ratio of the block copolymer to the sulfite compound.

C. Emulsion concentrate formulation of sulfite compound which contains a solvent system.

D. Untreated check.

The results seven days after treatment are shown in Table 2.

TABLE 2

| | Phytotoxicity rank | | | | | |
|---|---|---|---|---|---|---|
| Replicate | 1 | 2 | 3 | 4 | 5 | Mean |
| Treatment: | | | | | | |
| A | 3 | 2 | 3 | 3 | 3 | 2.80 |
| B | 2 | 3 | 2 | 2 | 2 | 2.20 |
| C | 4 | 4 | 4 | 4 | 4 | 4.00 |
| D | 1 | 1 | 1 | 1 | 1 | 1.00 |

These results demonstrate that the adjuvant formulation of the block copolymer reduces the phytotoxicity potential of the sulfite compound.

EXAMPLE 3

I. A wettable powder formulation (of Example 1A) of the sulfite compound is made into a spray mixture having about one pound of the sulfite formulation per 100 gallons of water; about ¾ of a pound of Guthion-50W[1]; and

[1] O,O-dimethyl-S-(4-oxobenzotriazino-3-methyl) phosphorodithioate.

about 4 pounds of Naiphos ZM.[2] This spray mixture is applied by an air carrier sprayer at a rate of about 550 gallons per acre of nectarines.

After about 7 days phytotoxicity is evidenced by the appearance of spotting on the nectarines.

II. Another treatment with the same spray mixture plus the addition of ½ pint of the spray adjuvant per 100 gallons of water, failed to induce nectarine spotting in all three replications. Examples 2 and 3 demonstrate that the addition of the block copolymer reduces phytotoxicity in foliage and fruit. Moreover, it is significant that this beneficial effect is achieved in a spray solution which contains two additional materials, namely, an insecticide formulation and a nutritional formulation.

EXAMPLE 4

A phytotoxicity experiment on cowpeas is conducted in a manner similar to that outlined in Example 1 with the following variations:

1. 1,000 p.p.m. of active sulfite compound is applied.
2. The spray adjuvants are applied at 2,000 p.p.m. of the block copolymer.
3. Ten individual plant replicates per treatment are used.

The treatments in this experiment are:
A. Emulsion concentrate formulation of the sulfite compound.
B. Same as in A, plus the spray adjuvant.
C. Same as in A, plus Multifilm X-77 [3].
D. Wettable powder formulation of the sulfite compound.
E. Wettable powder formulation of the sulfite compound plus the spray adjuvant.
F. Wettable powder formulation of the sulfite compound plus Multifilm X-77.
G. Untreated check.

The results nine days after treatment are shown in Table 3. The data in Table 3 is obtained using the ranking technique discussed in Example 1.

TABLE 3

| Replicate | 1 | 2 | 3 | 4 | 5 | 6 | 7 | 8 | 9 | 10 | Mean | |
|---|---|---|---|---|---|---|---|---|---|---|---|---|
| Treatment: | | | | | | | | | | | | |
| A | 2 | 2 | 7 | 4 | 2 | 2 | 4 | 5 | 6 | 6 | 4.0 | Emulsion. |
| B | 6 | 4 | 3 | 5 | 4 | 3 | 3 | 4 | 3 | 2 | 3.7 | |
| C | 7 | 7 | 6 | 7 | 7 | 7 | 7 | 7 | 7 | 7 | 6.9 | |
| D | 3 | 5 | 2 | 2 | 5 | 4 | 5 | 3 | 4 | 4 | 3.7 | Wettable powder. |
| E | 4 | 3 | 5 | 3 | 6 | 5 | 2 | 2 | 2 | 3 | 3.5 | |
| F | 5 | 6 | 4 | 6 | 3 | 6 | 6 | 6 | 5 | 5 | 5.2 | |
| G | 1 | 1 | 1 | 1 | 1 | 1 | 1 | 1 | 1 | 1 | 1.0 | Control. |

The results shown in Table 3 demonstrate that the spray adjuvant containing the block copolymer reduces the phytotoxicity of both sulfite compound formulations and that Multifilm X-77 increases the phytotoxicity of both formulations.

EXAMPLE 5

Another phytotoxicity experiment on cowpeas is conducted in a manner similar to that outlined in Example 1 with the following variations:

1. 1,000 p.p.m. of active sulfite compound was applied.
2. Ten individual plant replicates per treatment is used.

The treatments in the experiment are:
A. Emulsion concentrate formulation of the sulfite compound.
B. Same as in A, plus the spray adjuvant solution at 1,000 p.p.m.

---

[2] Nitrogen 8.0% (Ammonium—3%; derived from urea—5.0%); Phosphoric acid 7.0%; Zinc, metallic 18.0%; Manganese, metallic 7.0%.
[3] Multifilm X-77 is essentially polyoxyethylene (8 to 10) nonylphenol ether, a widely used standard spray adjuvant.

C. Same as in A, plus the spray adjuvant solution at 2,000 p.p.m.
D. Wettable powder formulation of the sulfite compound.
E. Same as in D, plus the spray adjuvant solution at 1,000 p.p.m.
F. Same as in D, plus the spray adjuvant solution at 2,000 p.p.m.

The results seven days after treatment are shown in Table 4. The results demonstrate better reduction in phytotoxicity with a higher rate (2,000 p.p.m.) of the block copolymer.

TABLE 4

| Replicate | 1 | 2 | 3 | 4 | 5 | 6 | 7 | 8 | 9 | 10 | Mean |
|---|---|---|---|---|---|---|---|---|---|---|---|
| Treatment: | | | | | | | | | | | |
| A | 6 | 6 | 6 | 6 | 6 | 5 | 6 | 6 | 4 | 6 | 5.6 |
| B | 5 | 3 | 5 | 4 | 5 | 6 | 3 | 5 | 6 | 4 | 4.6 |
| C | 4 | 4 | 2 | 5 | 1 | 4 | 4 | 3 | 5 | 1 | 3.3 |
| D | 1 | 5 | 4 | 3 | 2 | 2 | 5 | 4 | 3 | 5 | 3.4 |
| E | 3 | 1 | 3 | 1 | 4 | 1 | 2 | 2 | 2 | 3 | 2.2 |
| F | 2 | 2 | 1 | 2 | 3 | 3 | 1 | 1 | 1 | 2 | 1.8 |

EXAMPLE 6

This phytotoxicity experiment on cowpeas is conducted in a manner similar to that outlined in Example 1 with the following variations:

1. 1,000 p.p.m. of sulfite compound is applied.
2. Seven individual plant replicates are used.

The treatments in the experiment are:
A. Emulsion concentrate formulation of the sulfite compound.
B. Same as in A, plus polyoxyethylene (10) nonylphenol ether—1,000 p.p.m.
C. Same as in A, plus polyoxyethylene (10) nonylphenol ether—2,000 p.p.m.
D. Same as in A, plus polyoxyethylene (10) octylphenol ether—1,000 p.p.m.
E. Same as in A, plus polyoxyethylene (10) octylphenol ether—2,000 p.p.m.
F. Same as in A, plus polyoxyethylene (10) trimethyldecyl ether—1,000 p.p.m.
G. Same as in A, plus polyoxyethylene (10) trimethyldecyl ether—2,000 p.p.m.
H. Same as in A, plus polyoxyethylene (10) n-tetradecyl ether—1,000 p.p.m.
I. Same as in A, plus polyoxyethylene (10) n-tetradecyl ether—2,000 p.p.m.
J. Same as in A, plus the block copolymer—1,000 p.p.m.
K. Same as in A, plus the block copolymer—2,000 p.p.m.
L. Untreated check.

The results seven days after treatment are shown in Table 5.

TABLE 5

| Replicate | 1 | 2 | 3 | 4 | 5 | 6 | 7 | Mean |
|---|---|---|---|---|---|---|---|---|
| Treatment: | | | | | | | | |
| A | 2 | 7 | 10 | 3 | 3 | 3 | 4 | 4.57 |
| B | 4 | 6 | 6 | 4 | 7 | 5 | 9 | 5.86 |
| C | 10 | 12 | 11 | 6 | 11 | 11 | 11 | 10.29 |
| D | 11 | 5 | 8 | 8 | 4 | 10 | 8 | 7.71 |
| E | 7 | 3 | 9 | 5 | 10 | 9 | 12 | 7.86 |
| F | 5 | 8 | 7 | 11 | 9 | 8 | 3 | 7.29 |
| G | 8 | 10 | 4 | 10 | 5 | 7 | 10 | 7.71 |
| H | 9 | 4 | 3 | 9 | 6 | 6 | 7 | 6.29 |
| I | 12 | 11 | 12 | 12 | 12 | 12 | 6 | 11.00 |
| J | 3 | 9 | 5 | 2 | 2 | 4 | 5 | 4.29 |
| K | 6 | 2 | 2 | 7 | 8 | 2 | 2 | 4.14 |
| L | 1 | 1 | 1 | 1 | 1 | 1 | 1 | 1.00 |

Treatments B through I encompass most of the nonionic types of surfactants commonly used in agricultural spray adjuvants. It will be noted that these surfactants increase the phytotoxicity of the emulsion concentrate formulation of the sulfite compound, and that the block copolymer (treatments J and K) reduces phytotoxicity.

EXAMPLE 7

This experiment was conducted on two week old cotton plants, two week old cowpea plants, and three and one-half week old tomato plants. Emulsion concentrate formulations of the sulfite compound at 2,000 p.p.m. of sulfite compound was applied in spray form to the point where it ran off of the plants. Another experiment was run wherein the emulsion concentrate formulation plus the spray adjuvant (one pint of spray adjuvant per 100 gallons water) was added. The mean results for 10 replicates each are obtained seven days after treatment and are shown in Table 6.

TABLE 6

| Treatment | Mean percent phytotoxicity | | |
|---|---|---|---|
| | Cotton | Cowpeas | Tomato |
| Emulsion concentrate formulation of the sulfite compound only | 35 | 50 | 3.75 |
| Emulsion concentrate formulation of the sulfite compound only plus spray adjuvant | 10 | 16.5 | 2.25 |
| Emulsion concentrate formulation of the sulfite compound only | 35 | 50 | 3.75 |

These results demonstrate that the beneficial effect of adding the block copolymer to the sulfite compound is also apparent with other plant species.

The acaricidal effectiveness of the improved compositions will be demonstrated in the examples which follow:

EXAMPLE 8

Two cowpea plants per pot, in the trifoliate expansion stage are infested with Two-spotted spider mites. Following infestation, the plants are sprayed to the point of run-off with a wettable powder formulation of the sulfite compound, at 62.5 p.p.m. of the sulfite ingredient, with and without one-half pint of spray adjuvant per 100 gallons of water. The plants are then held in a greenhouse at 70° F. After ten days the primary leaves are removed, and the mites are brushed onto a glass counting plate with a mite brushing machine. The mites are then counted with a binocular microscope. The results are shown in Table 7.

TABLE 7

| Treatment | Mites per leaf | | | | Mean percent control |
|---|---|---|---|---|---|
| | Rep. 1 | Rep. 2 | Rep. 3 | Mean | |
| Wettable powder formulation sulfite compound | 163 | 30 | 288 | 160.33 | 17.78 |
| Wettable powder formulation sulfite compound plus spray adjuvant | 48 | 20 | 30 | 32.67 | 83.24 |
| Untreated check | 160 | 315 | 110 | 195.00 | 0.00 |

These results demonstrate enhancement of the acaricidal activity of the wettable powder formulation of the sulfite compound, when the block copolymer is added.

EXAMPLE 9

An acaricidal performance experiment on cowpeas is conducted in the same manner as that outlined in Example 8. In this case, however, the sulfite compound is formulated at 50 p.p.m. active ingredient in water, using isopropanol as a co-solvent. Treatments are made with and without surfactants at 50 p.p.m. The results twelve days after treatment are shown in Table 8.

TABLE 8

| Treatment | Mites per leaf | | | | | Mean percent control |
|---|---|---|---|---|---|---|
| | Rep. 1 | Rep. 2 | Rep. 3 | Rep. 4 | Mean | |
| Sulfite compound only | 105 | 168 | 68 | 55 | 99.00 | 10.40 |
| Sulfite compound plus the block copolymer | 28 | 13 | 17 | 20 | 19.50 | 82.35 |
| Sulfite compound plus polyoxyethylene (10) nonylphenol ether | 138 | 25 | 58 | 45 | 66.50 | 39.82 |
| Sulfite compound plus dioctyl ester of sodium sulfosuccinic acid | 73 | 70 | 42 | 35 | 55.00 | 50.22 |
| Untreated check | 132 | 110 | 95 | 105 | 110.50 | 0.00 |

The addition of surfactants enhanced acaricidal activity in all cases. However, the block copolymer enhanced the acaricidal activity of the sulfite compound even better.

The emulsion concentrate formulation of the sulfite compound is a proven acaricide. However, when the sulfite is applied at a very low (threshold) rate with the adjuvant containing the block copolymer, the results are considerably improved, as shown in the Example next.

EXAMPLE 10

Cowpea plants, on the basis of 2 plants per pot, in the trifoliate expansion stage are infested with Two-spotted spider mites. The plants are then sprayed to the point of run-off with the treatments shown in Table 9. The plants are then held in a greenhouse at 70° F. After 8 days the primary leaves are removed and the mites are brushed onto a counting plate. The mites and eggs are then counted with a binocular microscope. The mean results are shown in Table 9.

TABLE 9

| | P.p.m. of sulfite compound in emulsion concentrate formulation | P.p.m. adjuvant of block copolymer | Replicate* | | | Mean No./ leaf | Mean percent contro |
|---|---|---|---|---|---|---|---|
| | | | 1 | 2 | 3 | | |
| Mites: | | | | | | | |
| 1 | None | None | 37 | 38 | 34 | 36.33 | 0.00 |
| 2 | 25 | None | 53 | 21 | 29 | 34.33 | 5.51 |
| 3 | None | 25 | 50 | 31 | 31 | 37.33 | 0.00 |
| 4 | 25 | 25 | 7 | 3 | 3 | 4.33 | 88.08 |
| Eggs: | | | | | | | |
| 5 | None | None | 51 | 47 | 37 | 45.00 | 0.00 |
| 6 | 25 | None | 40 | 22 | 22 | 28.00 | 37.78 |
| 7 | None | 25 | 67 | 34 | 37 | 46.00 | 0.00 |
| 8 | 25 | 25 | 5 | 6 | 3 | 6.47 | 89.62 |

*Each replicate is 10 primary leaves.

In order to demonstrate that the interaction of the sulfite compound in emulsion concentrate formulation and the adjuvant of block copolymer is synergistic for both mite control and reduction of eggs, the following treatments are performed utilizing Colby's [4] formula:

TABLE 10

| Sulfite compound | Adjunct copolymer | Percent mite control | | Percent egg reduction | |
|---|---|---|---|---|---|
| | | Observed | Expected | Observed | Expected |
| 50 p.p.m | 100 p.p.m | 21.05 | | 10.71 | |
| 50 p.p.m | | 31.58 | | 40.48 | |
| 50 p.p.m | 100 p.p.m | 89.47 | 45.98 | 81.06 | 46.85 |

Expected = 100 − (100 − observed control with sulfite)·(100 − observed control with adjuvant copolymer) / 100

It is to be emphasized that other sulfurous acid organic esters are operable within the context of the invention—e.g., those shown in U.S. Pat. 3,463,859, which is herein incorporated by reference; especially the chemicals delineated in the table of column 7 of said patent.

The invention has been described by reference to specific embodiments. However it is to be understood that variations and departures may be made without departing from the spirit and scope of the inventive concept (i.e., employing the admixtures of the invention to check red mite infested citrus fruits such as oranges or upon mite infested cotton fields) and that the examples are descriptive of rather than limited to the invention coverage.

---

[4] S. R. Colby "Weeds" Vol. 15, p. 20–22 (1967).

What is claimed is:

1. An acaricidal composition comprising an admixture of (A) a polyoxyethylene - polyoxypropylene-polyoxyethylene ether copolymer represented by the formula:

HO—[$CH_2CH_2O$]$_{60}$[$CH(CH_3)CH_2O$]$_{40}$[$CH_2CH_2O$]$_{60}$H and (B) propargyl 2-(p-tert.-butylphenoxy) cyclohexyl sulfite, the weight ratio of (A) to (B) being from about 1:1 to 2:1.

2. A method of protecting plants against attack by mites comprising applying to said plants an acaricidally effective amount of a composition comprising an admixture of (A) a polyoxyethylene-polyoxypropylene-polyoxyethylene ether copolymer represented by the formula:
HO—$[CH_2CH_2O]_{60}[CH(CH_3)CH_2O]_{40}[CH_2CH_2O]_{60}$H
and (B) propargyl 2-(p-tert.-butylphenoxy) cyclohexyl sulfite, the weight ratio of (A) to (B) being from about 1:1 to 2:1.

References Cited

UNITED STATES PATENTS

| | | | |
|---|---|---|---|
| 2,547,724 | 4/1951 | Sundholm | 424—277 |
| 2,674,619 | 4/1954 | Lundsted | 260—30.8 R |
| 3,236,622 | 2/1966 | Hartley et al. | 424—78 X |
| 3,272,854 | 9/1966 | Covey et al. | 424—303 X |

FOREIGN PATENTS 9,320    4/1969    Japan.

ALBERT T. MEYERS, Primary Examiner

A. J. ROBINSON, Assistant Examiner

U.S. Cl. X.R.

424—303